TIME-INTENSITY DIAGRAM
OF THE EXCITING LIGHT

TIME-INTENSITY DIAGRAM
OF THE INDUCED EMISSION
OF A GLASS CERAMIC ROD
DOPED WITH 1.7% $Nd_2O_3$ 3,843,551
GLASS CERAMIC AS AN ACTIVE LASER MATERIAL
Gerd Muller, Mainz-Weisenau, and Norbert Neuroth, Stollhenn, Germany, assignors to JENAer Glaswerk Schott & Gen., Mainz, Germany
Filed Feb. 15, 1973, Ser. No. 332,938
Claims priority, application Germany, Feb. 18, 1972, P 22 07 634.2
Int. Cl. C03e 3/22; C09k 1/54; H01s 3/16
U.S. Cl. 252—301.4 F
4 Claims

ABSTRACT OF THE DISCLOSURE

A laserable article consisting essentially of transparent, substantially scatter-free glass ceramic as host material containing activating agent rendering the article capable of induced emission and luminescence, of the following composition on the oxide basis:

Figure 1:
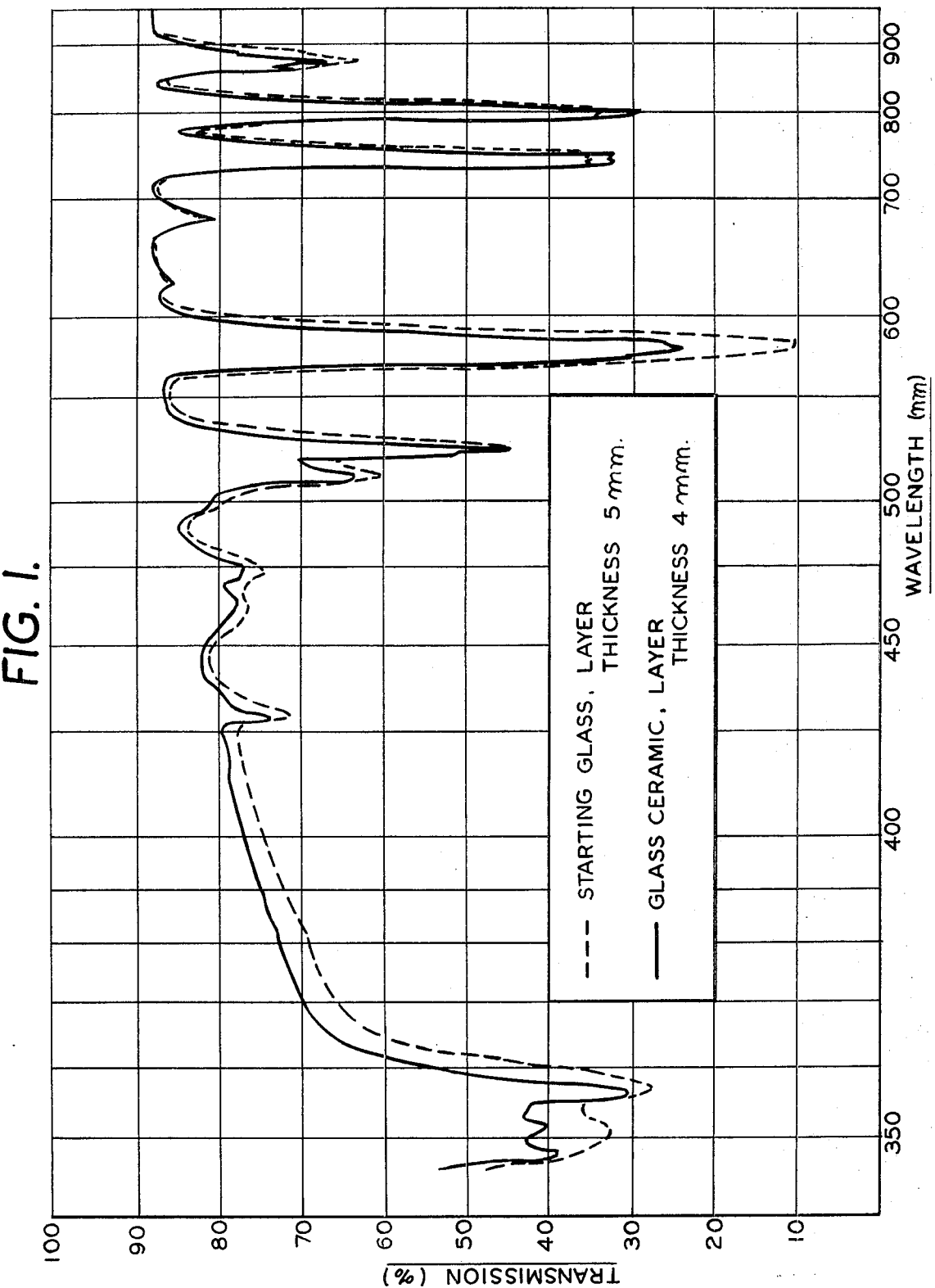

| | Weight percent |
|---|---|
| $SiO_2$ | 45–68 |
| $Al_2O_3$ | 15–30 |
| $P_2O_5$ | 0–10 |
| $Li_2O$ | 2–6 |
| $MgO$ | 0–3 |
| $ZnO$ | 0–8 |
| $ZrO_2$ | 2–7 |
| $Ta_2O_5$ | 1–7 |
| $La_2O_3$ | 3–12 |
| Activating agent | 0.1–5 | the activating agent being at least one of MnO and rare earth oxides selected from $Eu_2O_3$, $Sm_2O_3$, $Tb_2O_3$ and $Nd_2O_3$, the article being at least 25% crystalline by weight of which the principal crystalline phase has a high quartz structure, and the article having a linear coefficient of thermal expansion of not more than $15 \cdot 10^{-7 \circ}$ C. measured over 20–300° C.

---

In U.S. patent application Ser. No. 86,010, filed Nov. 2, 1970, now abandoned and replaced by Ser. No. 358,-224, filed May 8, 1973 which is a continuation of said Ser. No. 86,010, of Neuroth Norbert, hereof, solids are described for the production of luminescence and induced emission, which are characterized in that the host material for the activation ions consists of a glass ceramic.

The intensity of fluorescence (quantum yield) and the optical transmission properties of the material within the range of the exciting and emitted radiation are decisive characteristics for the applicability of such materials.

It has been found that the colorless, transparent glass ceramics of low thermal expansion which are described in U.S. application Ser. No. 267,266, filed June 29, 1972 was especially suited for activation to fluorescence on account of their transparency. Thereby laserable articles of desirable properties can be obtained. The reasons for this lies on the one hand in the fact that, in the short wavelength range where the excitation of most of the activation ions takes place, the light scatter which is found in all glass ceramics is especially low in these glass ceramics. On the other hand, they do not have the strong light absorption in the area of the emission wavelength of the neodymium ions around 1060 nm. which is characteristic of glass ceramics of low thermal expansion containing $TiO_2$ as a nucleating component. Furthermore, it has surprisingly been found that the intensity of fluorescence in these glass ceramics attains values which make stimulated emission possible. This is especially the case with those glass ceramics named in said application Ser. No. 267,266 which contain up to 12 wt. percent of rare earth oxides. In particular, $La_2O_3$ contents of 3 to 12 wt. percent have proven very favorable to ceramization. $Nd_2O_3$, $Eu_2O_3$, $Sm_2O_3$ and $Tb_2O_3$ have proven very favorable for the activation of fluorescence.

The activation ion content in these glass ceramics can best range between about 0.1 and about 5 percent by weight. Contents above 5 weight-percent produce scarcely any improvement, and usually they result in an impairment of the fluorescence of the glass ceramic on account of interaction by the ions (concentration extinction).

In its broadest meaning, the present invention thus embraces glass ceramics which are made by known methods through controlled heat treatment from glasses having a composition which consist essentially of the following on the basis of oxides in weight-percent:

| | Broad range, wt.-percent | Preferred range |
|---|---|---|
| $SiO_2$ | 45–68 | 45–60 |
| $Al_2O_3$ | 15–30 | 15–25 |
| $P_2O_5$ | 0–10 | 3–10 |
| $Li_2O$ | 2–6 | 3–5 |
| $MgO$ | 0–3 | 0–3 |
| $ZnO$ | 0–8 | 0–6 |
| $ZrO_2$ | 2–7 | 3–7 |
| $Ta_2O_5$ | 1–7 | 2–7 |
| Rare earth oxides* | 0–12 | 0–10 |
| Activating agents | 0.1–5 | 0.1–5 |

*Not functioning as activating agents.

Desirably, the composition is composed of the foregoing composition to the extent of at least 85% thereof.

In this the rare earths serve two purposes: one the achievement of a scatter-free ceramic, and the other the production of the fluorescence or induced emission.

Furthermore, it is desirable for the glasses to contain one or more of the customary fining agents, e.g., 1 wt. percent $As_2O_3$ in conjunction with 1 wt. percent of $K_2O$ which is introduced into the mixture as a nitrate. Other additives, such as CaO, BaO or PbO, are possible and may improve the melting properties, although in each case it must be determined whether they will have an adverse influence on the transmittancy of the glass ceramic.

The introduction of batch components in the form of fluorides may have desirable effects on the fining characteristics of the glass and on the crystallization during the controlled heat treatment.

Figure 2:
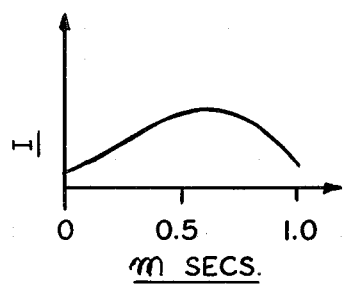
Figure 3:
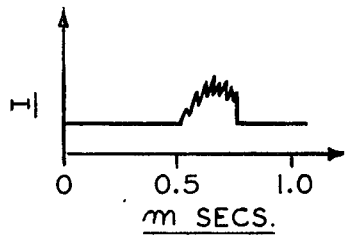
Figure 4:
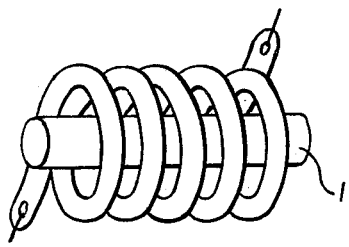

In the drawings:
FIG. 1 is a spectral graph for a glass and the corresponding glass ceramic;
FIG. 2 is a time-intensity graph for exciting light;
FIG. 3 is the time-intensity graph for the induced emission corresponding to FIG. 2; and
FIG. 4 is a laser or maser outfitted with a glass ceramic 1, as a molecular oscillator, according to the invention.

The basic glasses preferably can be melted at maximum temperatures of 1600° C. This is important inasmuch as a laser material has to satisfy very exacting homogeneity requirements which can rarely be satisfied under extreme melting conditions.

The transformation of the glasses to the glassy-crystalline state may be performed by known methods described in said application Ser. No. 267,266. The circumstance that, in this transformation, a large part of the formerly glassy material is transformed to the crystalline state is evidenced in the absorption spectrum of the activation ions. That is, while the known broad absorption bands are observed prior to the transformation, it is found after the transformation that a number of them have resolved into a plurality of sharp peak. An example is the bands in the spectral range of 348–356 nm., 473 nm., 523 nm., 580 nm. and 880 nm. in the case of activation with $Nd_2O_3$ (FIG. 1). At least 25 wt. percent, preferably >50 wt. percent of the glass ceramic is crystalline.

The highest fluorescence intensities are observed in these glass ceramics without the loss of their other desirable characteristics.

All of the glass ceramics listed contain as the crystalline principal phase mixed crystals with a high quartz structure. The low thermal expansion of this type of crystal, which provides the glass ceramics of the invention with thermal longitudinal expansions $\alpha_{20-300° C.} \leq 15 \cdot 10^{-7}/° C.$, is especially useful in a laser material in that the danger of destruction by thermal tensions is considerably diminished.

The following example will serve to explain the manufacture and the characteristics of the glass ceramics activated with Nd in accordance with the invention.

EXAMPLE

The batch mixture has the following calculated oxide composition (in weight-percent):

| | Wt. Percent |
|---|---|
| $SiO_2$ | 51.7 |
| $Al_2O_3$ | 19.2 |
| $P_2O_5$ | 4.8 |
| $Li_2O$ | 3.9 |
| $K_2O$ | 0.6 |
| MgO | 1.1 |
| ZnO | 1.3 |
| $ZrO_2$ | 4.8 |
| $Ta_2O_5$ | 2.9 |
| $La_2O_3$ | 7.0 |
| $Nd_2O_3$ | 1.7 |
| $As_2O_3$ | 1.0 |

High purity is the main consideration in selecting the raw materials, because, as it is known in the laser art, impurities even in slight concentration can appreciably impair fluorescence.

From such a mixture a glass is melted in the electric furnace at temperatures around 1570° C.; this glass is cast and then cooled. Then rods of flaw-free glass are heated at 15° C./h. to 800° C., held at this temperature for 10 h., and then cooled down again at 15° C./h. Whereas prior to heat-treatment the thermal expansion of such rods was approximately $+50 \cdot 10^7/°$ C. (in the 20-300° C. range), thereafter it amounts to only $+8 \cdot 10^{-7}/°$ C.

X-ray examination reveals the formation of a considerable amount of high-quartz mixed crystals. In the absorption spectrum one finds the characteristic changes described above. Otherwise, the typical Nd coloration and the glassy appearance remain, aside from a very slight light scatter.

A rod 76 mm. long and 4 mm. in diameter was prepared from the material thus manufactured. The ends are polished plane-parallel. The rod is tested in a common laser apparatus. The excitation is performed with a rod-like xenon flash lamp whose arc is approximately 76 mm. long. It is located in the one focal line within a cylindrical reflector of elliptical cross section, and the test rod is located in the other. The two resonator mirrors consist of dielectric coatings; one of them has a reflectivity of 99% at the wavelength of 1060 nm., the other 89%. Under these conditions the induced emission occurred at a pumping energy of 290 Joules. If resonator mirrors with a reflectivity of 99% at the 1060 nm. wavelength are used at both ends, the induced emission takes place at a pumping energy of 145 Joules. FIG. 2 and FIG. 3 represent the time-intensity diagram of, respectively the light of the xenon flash lamp, and of the laser light emitted by the rod. The latter consists of a series of light flashes with a duration of 5 to 10 micro-seconds.

Activating ions other than $Nd_2O_3$ were used to dope the same basic composition, e.g. $Eu_2O_3$, $Sm_2O_3$, $Tb_2O_3$ and MnO. Fluorescent glass ceramics were obtained. The wavelength of the maximum fluorescence is located at 615, 598, 543 and 600 nm., respectively.

What is claimed is:

1. A laserable article consisting essentially of transparent, substantially scatter-free glass ceramic as host material containing activating agent rendering the article capable of induced emission and luminescence, of the following composition on the oxide basis:

| | Weight percent |
|---|---|
| $SiO_2$ | 45-68 |
| $Al_2O_3$ | 15-30 |
| $P_2O_5$ | 0-10 |
| $Li_2O$ | 2-6 |
| MgO | 0-3 |
| ZnO | 0-8 |
| $ZrO_2$ | 2-7 |
| $Ta_2O_5$ | 1-7 |
| $La_2O_3$ | 3-12 |
| Activating agent | 0.1-5 | the activating agent being at least one of MnO and rare earth oxides selected from $Eu_2O_3$, $Sm_2O_3$, $Tb_2O_3$ and $Nd_2O_3$, the article being at least 25% crystalline by weight of which the principal crystalline phase has a high quartz structure, and the article having a linear coefficient of thermal expension of not more than $15 \cdot 10^{-7}$ ° C. measured over 20-300° C.

2. The article of claim 1 wherein $Nd_2O_3$ is the activating agent.

3. Article according to claim 2, the composition being:

| | Weight percent |
|---|---|
| $SiO_2$ | 51.7 |
| $Al_2O_3$ | 19.2 |
| $P_2O_5$ | 4.8 |
| $Li_2O$ | 3.9 |
| $K_2O$ | 0.6 |
| MgO | 1.1 |
| ZnO | 1.3 |
| $ZrO_2$ | 4.8 |
| $Ta_2O_5$ | 2.9 |
| $La_2O_3$ | 7.0 |
| $Nd_2O_3$ | 1.7 |
| Fining agent | 1.0 |

4. Device for generation of ultra high frequency energy emission having as a molecular oscillator, a glass ceramic article according to claim 1.

References Cited

UNITED STATES PATENTS

| | | | |
|---|---|---|---|
| 2,049,765 | 8/1936 | Fischer | 252—301.4 F |
| 3,640,891 | 2/1972 | Lee et al. | 252—301.4 |
| 3,527,711 | 9/1970 | Barber et al. | 252—301.4 |
| 3,241,985 | 3/1966 | Kuwayaua | 106—52 X |
| 3,252,811 | 5/1966 | Beall | 106—52 X |
| 3,732,116 | 5/1973 | Reade | 106—52 X |
| 3,300,670 | 1/1967 | Veres | 106—52 UX |

FOREIGN PATENTS

| 1,300,614 | 6/1962 | France | 106—39.7 |
|---|---|---|---|

HELEN M. McCARTHY, Primary Examiner

U.S. Cl. X.R.

106—39.7, 52; 330—4.3; 331—94.5